United States Patent
Perlman et al.

(10) Patent No.: US 9,906,361 B1
(45) Date of Patent: Feb. 27, 2018

(54) STORAGE SYSTEM WITH MASTER KEY HIERARCHY CONFIGURED FOR EFFICIENT SHREDDING OF STORED ENCRYPTED DATA ITEMS

(71) Applicant: EMC Corporation, Hopkinton, MA (US)

(72) Inventors: Radia Perlman, Redmond, WA (US); Xuan Tang, Hopkinton, MA (US); Thomas Dibb, Rutland, MA (US); Greg Lazar, Upton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 363 days.

(21) Appl. No.: 14/752,012

(22) Filed: Jun. 26, 2015

(51) Int. Cl.
  *H04L 9/00* (2006.01)
  *H04L 9/08* (2006.01)
  *G06F 17/30* (2006.01)
  *G06F 21/62* (2013.01)

(52) U.S. Cl.
  CPC ........ *H04L 9/088* (2013.01); *G06F 17/30312* (2013.01); *G06F 17/30589* (2013.01); *G06F 21/6218* (2013.01); *H04L 9/0891* (2013.01)

(58) Field of Classification Search
  CPC .. H04L 9/0891; H04L 9/088; G06F 17/30589
  USPC ........................................................ 380/277
  See application file for complete search history.

(56) References Cited

U.S. PATENT DOCUMENTS

| | | |
|---|---|---|
| 6,577,734 B1 | 6/2003 | Etzel et al. |
| 7,814,318 B1 | 10/2010 | Perlman et al. |
| 8,650,657 B1 | 2/2014 | Shankar et al. |
| 9,071,429 B1 | 6/2015 | Roth et al. |
| 9,076,004 B1 | 7/2015 | Bogorad |
| 9,251,097 B1 | 2/2016 | Kumar et al. |
| 9,659,190 B1 | 5/2017 | Perlman et al. |
| 9,779,269 B1 | 10/2017 | Perlman |
| 2003/0002668 A1 | 1/2003 | Graunke et al. |

(Continued)

FOREIGN PATENT DOCUMENTS

EP   1414181 A1   4/2004

OTHER PUBLICATIONS

Radia Perlman, "File System Design with Assured Delete," 14th Annual Network and Distributed System Security Symposium (NDSS), Feb.-Mar. 2007, 13 pages.

*Primary Examiner* — Teshome Hailu
(74) *Attorney, Agent, or Firm* — Ryan, Mason & Lewis, LLP

(57) ABSTRACT

An apparatus comprises a storage system and a key manager incorporated in or otherwise associated with the storage system. The storage system comprises first storage of a first type and second storage of a second type with the first storage providing enhanced data protection relative to the second storage. The key manager is configured to maintain a master key hierarchy for the storage system. The master key hierarchy comprises a plurality of levels each including one or more master keys, with an uppermost level of the master key hierarchy comprising a root master key that is stored in the first storage and at least one lower level of the master key hierarchy comprising a plurality of master keys that are stored in the second storage under encryption by the root master key. Keys of a lowermost level of the master key hierarchy are associated with respective groups of data items.

20 Claims, 3 Drawing Sheets

(56) References Cited

U.S. PATENT DOCUMENTS

| | | |
|---|---|---|
| 2005/0018853 A1 | 1/2005 | Lain et al. |
| 2006/0282666 A1 | 12/2006 | Kim |
| 2006/0288232 A1 | 12/2006 | Ho et al. |
| 2007/0130615 A1* | 6/2007 | Brace .................. G06F 21/6209 726/4 |
| 2007/0226809 A1 | 9/2007 | Ellard |
| 2007/0245410 A1 | 10/2007 | Perlman et al. |
| 2008/0072047 A1* | 3/2008 | Sarikaya .................. H04L 9/32 713/171 |
| 2009/0110191 A1 | 4/2009 | Sanvido et al. |
| 2010/0054479 A1 | 3/2010 | Kao et al. |
| 2011/0158405 A1 | 6/2011 | Choi et al. |
| 2011/0173460 A1* | 7/2011 | Ito ........................ H04L 9/0836 713/193 |
| 2011/0283113 A1 | 11/2011 | Moffat et al. |
| 2012/0072716 A1 | 3/2012 | Hu et al. |
| 2012/0173885 A1* | 7/2012 | Acar ..................... G06F 21/602 713/193 |
| 2012/0284528 A1 | 11/2012 | Orovitz |
| 2013/0103945 A1 | 4/2013 | Cannon et al. |
| 2013/0290274 A1 | 10/2013 | Patil et al. |
| 2013/0305057 A1 | 11/2013 | Greco et al. |
| 2013/0322621 A1 | 12/2013 | Yoon et al. |
| 2014/0006802 A1 | 1/2014 | Cachin et al. |
| 2014/0025963 A1 | 1/2014 | Subramanian |
| 2014/0068257 A1 | 3/2014 | Burckard |
| 2014/0068279 A1 | 3/2014 | Kurspahic et al. |
| 2014/0283010 A1 | 9/2014 | Rutkowski et al. |
| 2014/0351605 A1 | 11/2014 | De Atley et al. |
| 2014/0359309 A1 | 12/2014 | Cachin et al. |
| 2015/0019870 A1 | 1/2015 | Patnala et al. |
| 2015/0220746 A1 | 8/2015 | Li et al. |
| 2015/0288512 A1* | 10/2015 | McGregor ............ H04L 9/0836 713/193 |
| 2016/0062918 A1 | 3/2016 | Androulaki et al. |
| 2016/0154839 A1 | 6/2016 | Bezawada et al. |
| 2016/0323250 A1 | 11/2016 | Winter et al. |
| 2016/0342814 A1 | 11/2016 | Wang et al. |
| 2017/0005809 A1 | 1/2017 | Adam et al. |

* cited by examiner

STORAGE SYSTEM WITH MASTER KEY HIERARCHY CONFIGURED FOR EFFICIENT SHREDDING OF STORED ENCRYPTED DATA ITEMS

FIELD

The field relates generally to storage systems, and more particularly to storage systems that utilize data encryption.

BACKGROUND

In many storage systems, data is stored under encryption utilizing one or more cryptographic keys, which are more generally referred to herein as "master keys." However, problems can arise in such systems in regard to "shredding" of stored encrypted data items, where shredding generally refers to effectively rendering unreadable or otherwise deleting a given stored encrypted data item through deletion of its associated master key. More particularly, shredding of stored encrypted data items under conventional practice can be unduly complex, in that it typically involves decryption of all data items to be retained followed by corresponding re-encryption of the retained data items using a new master key. This can significantly undermine the performance of the storage system, particularly for systems that store large amounts of data or are subject to frequent deletion of data items.

SUMMARY

Illustrative embodiments of the invention provide storage systems that include a master key hierarchy configured for efficient shredding of stored encrypted data items.

In one embodiment, an apparatus comprises a storage system and a key manager incorporated in or otherwise associated with the storage system. The storage system comprises first storage of a first type and second storage of a second type with the first storage providing enhanced data protection relative to the second storage. The key manager is configured to maintain a master key hierarchy for the storage system.

The master key hierarchy illustratively comprises a plurality of levels each including one or more master keys, with an uppermost level of the master key hierarchy comprising a root master key that is stored in the first storage and at least one lower level of the master key hierarchy comprising a plurality of master keys that are stored in the second storage under encryption by the root master key. In addition, each of a plurality of master keys of a lowermost level of the master key hierarchy is associated with a different group of data items and is utilized to encrypt the data items of that group for storage in the second storage.

The deletion of one or more selected data items in a given one of the groups of data items may be advantageously achieved in some embodiments without requiring decryption and re-encryption of any data items in any other ones of the groups, thereby providing substantial performance improvements in storage systems that store large amounts of data or are subject to frequent deletion of data items.

These and other embodiments include, without limitation, systems, apparatus, methods and processor-readable storage media.

DETAILED DESCRIPTION

Illustrative embodiments of the present invention will be described herein with reference to exemplary storage systems and associated processing devices. It is to be appreciated, however, that embodiments of the invention are not restricted to use with the particular illustrative system and device configurations shown. Accordingly, the term "storage system" as used herein is intended to be broadly construed, so as to encompass, for example, storage systems comprising storage arrays or other types and arrangements of storage products as well as cloud storage systems comprising virtual infrastructure.

Figure 1:
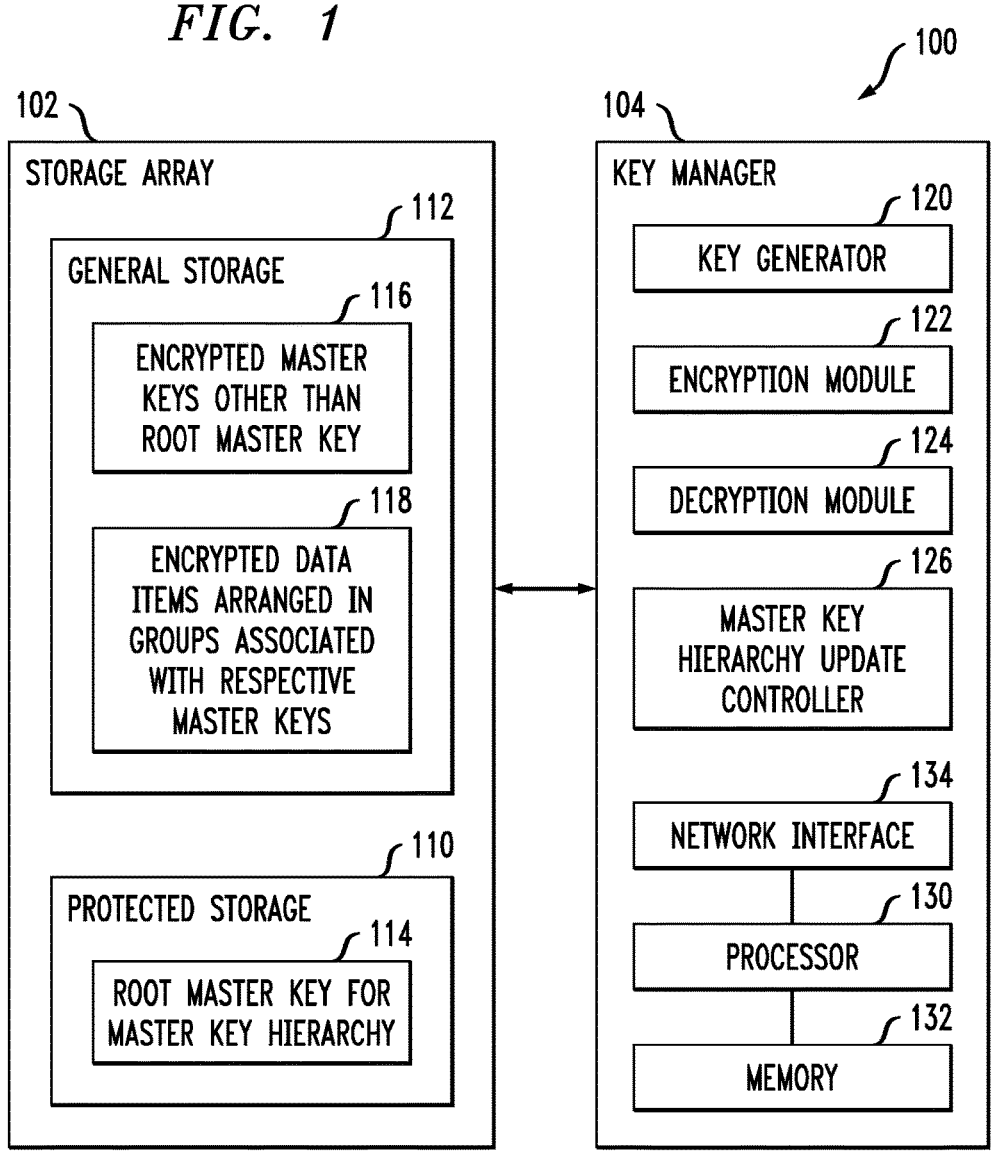
FIG. 1 is a block diagram of a storage system that includes a master key hierarchy configured for efficient shredding of stored encrypted data items in an illustrative embodiment of the invention.

FIG. 1 shows a storage system 100 configured in accordance with an illustrative embodiment of the present invention. The storage system 100 comprises a storage array 102 coupled to a key manager 104. Although the key manager 104 is shown as being separate from the storage array 102 in this embodiment, in other embodiments the key manager 104 may be at least partially incorporated into the storage array 102. Such an arrangement of a storage array comprising an internal key manager is considered an example of a "storage system" as that term is broadly utilized herein.

The storage array 102 comprises protected storage 110 and general storage 112. The protected storage 110 and the general storage 112 are examples of what are more generally referred to herein as respective first and second storage of the storage system. Such first storage is of a first type and second storage is of a second type, with the first storage providing enhanced data protection relative to the second storage. For example, in the present embodiment, it is assumed that data items are stored in encrypted form in the general storage 112, but that the protected storage 110 provides enhanced data protection relative to that provided by encrypted storage in the general storage 112.

The protected storage 110 may therefore comprise a trusted platform module or other highly secure module that provides the highest level of data protection available in the storage system 100. Additionally or alternatively, the protected storage 110 may provide stronger encryption than that provided for data items stored in the general storage 112. This stronger encryption may involve, for example, use of multiple encryption layers or other cryptographic techniques familiar to those skilled in the art.

In some embodiments, at least a portion of the protected storage 110 may comprise a secure database of the key manager 104. An embodiment of this type may be considered an example of an arrangement in which the key manager 104 is at least partially incorporated within the storage array 102.

As maintenance of the protected storage 110 can be complex in some embodiments, it is often desirable to minimize the amount of information that must be stored there. The encrypted stored data items in the general storage 112 are not subject to the same restrictions, and in some embodiments can even be replicated widely.

The key manager 104 is configured to maintain a master key hierarchy for the storage array 102. The master key hierarchy in the present embodiment illustratively comprises a plurality of levels with each such level including one or more master keys. As will be described in more detail below, some of the master keys of the master key hierarchy are utilized to encrypt respective groups of data items for storage in the general storage 112 and some of the master keys of the master key hierarchy are utilized to encrypt other master keys for storage in the general storage 112. The term "master key" as used herein is intended to be broadly construed so as to encompass a cryptographic key is utilized in performing cryptographic operations such as encryption or decryption within the storage system 100.

The master key hierarchy in the present embodiment is based at least in part on a partitioning of data items into groups with the data items of each such group being encrypted for storage in general storage 112 using a corresponding one of the master keys. Thus, different master keys of the master key hierarchy are used to encrypt the data items of different ones of the partitioned groups.

The plurality of levels of the master key hierarchy are assumed to include at least an uppermost level and a lowermost level, and possibly one or more intermediate levels arranged between the uppermost and lowermost levels. An example of a master key hierarchy with an uppermost level, a lowermost level and multiple intermediate levels will be described in more detail below in conjunction with FIG. 3.

The master key hierarchy in the present embodiment is assumed to comprise an uppermost level that includes a root master key 114. The root master key 114 is stored in the protected storage 110 of the storage array 102 and is therefore subject to enhanced data protection relative to that provided for data items stored in encrypted form in the general storage 112. An example of the root master key is master key M in the FIG. 3 embodiment.

An immediately lower level of the master key hierarchy comprises a plurality of additional master keys that are stored in the second storage under encryption by the root master key. These immediately lower level master keys illustratively include master keys M1, M2, M3, ... Mk, ... Mn of the example master key hierarchy of FIG. 3. Such encrypted master keys are part of the encrypted master keys other than the root master key and are denoted by reference numeral 116 in the general storage 112.

Also, each of a plurality of master keys of a lowermost level of the master key hierarchy is associated with a different group of data items and is utilized to encrypt the data items of that group for storage in the second storage 112. Encrypted data items arranged in groups associated with respective master keys of the lowermost level of the master key hierarchy are denoted by reference numeral 118 in the general storage 112.

It is possible for the master key hierarchy to include only two levels, in which case the immediately lower level and the lowermost level are the same level. By way of example, if there are a million data items to be stored in encrypted form in portion 118 of general storage 112, these data items could be partitioned into 100 groups {G1, G2, ... G100} where each group has 10,000 stored data items. The master key hierarchy in this example illustratively includes an uppermost level with a single root master key M, and a lowermost level with 100 master keys {M1, M2, ... M100}. Only the single root master key M is stored in protected storage 110, and the remaining master keys {M1, M2, ... M100} are stored in portion 116 of general storage 112, encrypted using the root master key M.

Figure 3:
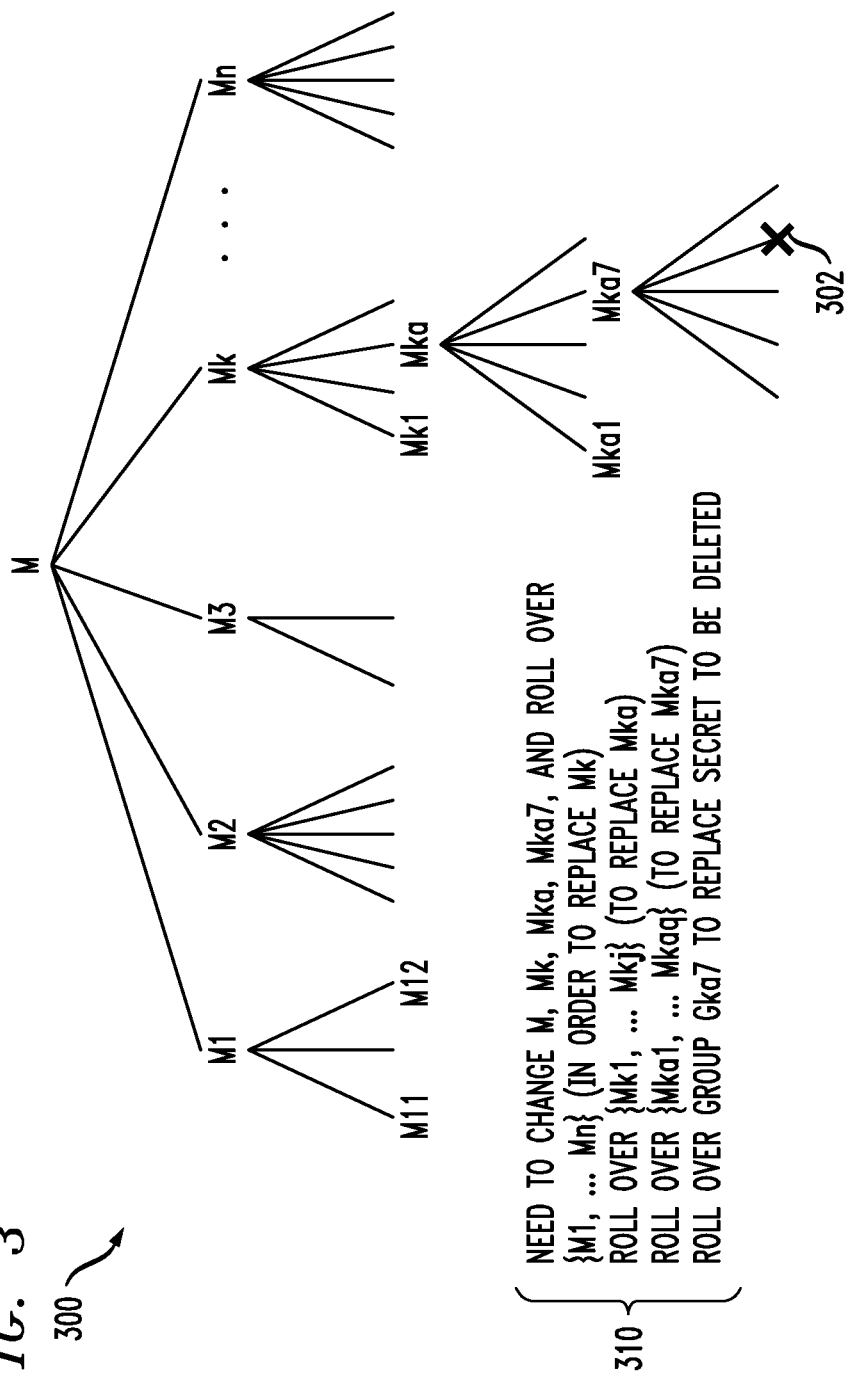
FIG. 3 illustrates one possible example of a master key hierarchy and associated processing operations in an illustrative embodiment.

However, a given master key hierarchy may more typically include one or more intermediate levels between the uppermost level and the lowermost level, as in the FIG. 3 embodiment, which includes two intermediate levels of master keys between the uppermost level with root master key M and the lowermost level that includes the master keys associated with respective groups of data items for storage in general storage 112.

The configuration of the master key hierarchy in terms of its number of levels and number of master keys on each level can be configured to accommodate various system constraints, such as a maximum number of data items per group.

Accordingly, it should be understood that a wide variety of master key hierarchy arrangements are possible. For example, the levels need not be symmetric or uniform in any way, and master keys of levels other than the lowermost level can be associated with groups of data items to be stored in the general storage 112.

At least one intermediate level of a master key hierarchy between the uppermost level and the lowermost level may therefore include at least one master key that does not have any child master keys in an immediately lower level but is instead used to encrypt a corresponding group of data items for storage in the general storage 112.

In addition, two or more intermediate levels of the master key hierarchy may comprise different numbers of master keys.

Additionally or alternatively, two or more intermediate levels of the master key hierarchy may each include at least one master key that is used to encrypt a corresponding group of data items for storage in the second storage.

Again, these are just examples, and numerous other master key hierarchy configurations can be used in other embodiments. For example, in some embodiments a master key hierarchy may comprise multiple root master keys, possibly all at the uppermost level of the master key hierarchy or possibly arranged at different levels of the hierarchy.

An advantage of the example master key hierarchy configurations described above is that shredding or other deletion of one or more selected data items in a given one of the groups can be achieved without requiring decryption and re-encryption of any data items in any other ones of the groups.

For example, the key manager 104 in the present embodiment is illustratively configured to delete one or more selected data items of a given one of the groups from the general storage 112 by obtaining the corresponding master key of the appropriate level of the master key hierarchy, decrypting the remaining data items of the given group using the corresponding master key, deleting the corresponding master key, obtaining a replacement master key for the corresponding master key, re-encrypting the remaining data items of the given group using the replacement master key, and storing the re-encrypted remaining data items of the given group in the general storage 112.

In conjunction with the above-described deletion of the one or more selected data items of the given group, the key manager 104 is further configured to replace additional master keys of the master key hierarchy in a direct path from the replacement master key up to and including the root master key of the uppermost level of the master key hierarchy, and to update the stored master keys of each of the levels of the master key hierarchy to account for the replacement.

With reference again to the previous two-level master key hierarchy example having an uppermost level with a single root master key M and a lowermost level with 100 master keys {M1, M2, ... M100} used to encrypt respective data item groups {G1, G2, . . . G100}, a data item is deleted from group G2 in the following manner. First, the root master key M is obtained from protected storage 110 and used to decrypt master key M2 from portion 116 of general storage 112. The decrypted master key M2 is used to decrypt any remaining items from G2 that are not being deleted. A replacement master key M2' is obtained, and the master key M2 is deleted. The remaining data items from G2 are re-encrypted using the replacement master key M2' and stored in portion 118 of the general storage 112. Also, the root master key M is used to decrypt all other master keys except M2 which was replaced with M2'. A replacement root master key M' is obtained, and the updated set of master keys {M1, M2', . . . M100} is then encrypted under the replacement master key M' and stored in portion 116 of general storage 112. Thus, deletion of the data item from group G2 is achieved without requiring decryption and re-encryption of any of the data items from any of the other groups.

In an arrangement of this type, it is only a single one of the groups of data items and its associated portions of the master key hierarchy that are subject to decryption and re-encryption operations. This is also referred to herein as "rolling over" the group of data items and the associated portions of the master key hierarchy. The data items in all other groups of data items in the general storage 112 remain unchanged, and are therefore not rolled over. Such an arrangement provides a considerable performance improvement relative to conventional arrangements in which all stored data items are potentially subject to decryption and re-encryption operations upon deletion of a single data item.

The storage array 102 in the storage system 100 can be implemented utilizing storage arrays such as VNX® and Symmetrix VMAX®, both commercially available from EMC Corporation of Hopkinton, Mass.

However, storage systems with master key hierarchy functionality as disclosed herein can be implemented using a wide variety of additional or alternative arrangements of storage devices. For example, a given storage system as the term is broadly utilized herein can comprise a plurality of scale-out network-attached storage (NAS) clusters. These NAS clusters may be implemented, for example, using Isilon® storage platforms, such as storage platforms comprising Isilon® platform nodes and associated accelerators in the S-Series, X-Series and NL-Series product lines, commercially available from EMC Corporation. Other storage products such as ViPR® Software-Defined Storage (SDS), ScaleIO™ and XtremIO™, all from EMC Corporation, can additionally or alternatively be used.

The key manager 104 in the storage system 100 illustratively comprises a key generator 120, an encryption module 122, a decryption module 124 and a master key hierarchy update controller 126. The key generator 120 is utilized to generate master keys for use in the master key hierarchy. Additionally or alternatively, at least a subset of the master keys of the master key hierarchy can be supplied to the key manager from an external component of the storage system 100, although such a component is not explicitly shown in the figure. The encryption and decryption modules 122 and 124 are utilized to encrypt and decrypt data items and associated master keys of the master key hierarchy in conjunction with storage in and retrieval from the portions 116 and 118 of the general storage 112. The master key hierarchy update controller 126 controls updating of the master keys of the master key hierarchy as needed in order to effect deletion of selected data items from the portion 118 of the general storage 112. This includes controlling the manner in which particular groups of data items or portions of the master key hierarchy are "rolled over" in conjunction with deletion of selected data items.

It is to be appreciated that this particular arrangement of key manager modules illustrated in the FIG. 1 embodiment is presented by way of example only, and alternative arrangements can be used in other embodiments. For example, the functionality associated with the modules 120, 122, 124 and 126 in other embodiments can be combined into a single module, or separated across a larger number of modules.

The key manager 104 in the FIG. 1 embodiment is assumed to be implemented using at least one processing device. Each such processing device generally comprises at least one processor and an associated memory, and implements one or more functional modules for controlling certain features of the key manager 104.

More particularly, the key manager 104 in this embodiment comprises a processor 130 coupled to a memory 132 and a network interface 134.

The processor 130 illustratively comprises a microprocessor, a microcontroller, an application-specific integrated circuit (ASIC), a field-programmable gate array (FPGA) or other type of processing circuitry, as well as portions or combinations of such circuitry elements.

The memory 132 illustratively comprises random access memory (RAM), read-only memory (ROM) or other types of memory, in any combination. The memory 132 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, an integrated circuit containing electronic memory, or a wide variety of other types of computer program products comprising processor-readable storage media. The term "article of manufacture" as used herein should be understood to exclude transitory, propagating signals.

The network interface 134 allows the key manager 104 to communicate with the storage array 102 and possibly also with other system components not explicitly illustrated. For example, the key manager may be configured in some embodiments to communicate via network interface 134 with user devices and administrator terminals. The network interface 134 illustratively comprises one or more conventional transceivers.

At least portions of the key manager 104, such as portions of one or more of key generator 120, encryption module 122, decryption module 124 and master key hierarchy update controller 126, may be implemented at least in part in the form of software that is stored in memory 132 and executed by processor 130.

It is to be understood that the particular set of elements shown in FIG. 1 for configuring a storage system and associated key manager is presented by way of illustrative example only, and in other embodiments additional or alternative elements may be used. Thus, another embodiment may include additional or alternative systems, devices and other entities, as well as different arrangements of modules and other components.

For example, other embodiments can include an input-output controller coupled to the key manager 104 and configured to control storage of data items in the storage system 100. Such a controller can obtain keys from the key manager for use in encrypting data items for storage in the storage system. In an embodiment of this type, the encryption and decryption modules 122 and 124 can be implemented in the input-output controller rather than in the key manager 104 as shown in system 100 of FIG. 1. Alternatively, the input-output controller can include its own encryption and decryption modules, in addition to those of the key manager 104. Other placements of encryption and decryption modules are possible in other embodiments.

It is also possible that the key manager 104 can be implemented at least in part within the input-output controller, or that the input-output controller can be implemented at least in part within the key manager. Such arrangements are considered alternative couplings of the key manager and input-output controller. The input-output controller in other embodiments can be part of the storage array 102.

Communications between the various elements of storage system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the storage array 102 and the key manager 104 may be implemented using one or more processing platforms. A given such processing platform includes at least one processing device comprising a processor coupled to a memory, and the one or more processing devices may be implemented at least in part utilizing one or more virtual machines or other types of virtualization infrastructure such as Linux containers (LXCs) in association with underlying physical hardware.

It is to be appreciated that a given embodiment of the storage system 100 may include multiple instances of the storage array 102 and the key manager 104, although only a single instance of each of these elements is shown in the system diagram for clarity and simplicity of illustration.

Accordingly, the particular set of components implemented in the storage system 100 as illustrated in FIG. 1 is presented by way of example only. In other embodiments, alternative sets of components may be used, and such components may exhibit alternative functionality and configurations.

The operation of the storage system 100 will now be described in further detail with reference to the flow diagram of FIG. 2. The process as shown includes steps 200 through 208, and is suitable for use in the storage system 100 but is more generally applicable to other storage systems implementing functionality based on a master key hierarchy as disclosed herein.

It is assumed that the master key hierarchy in this embodiment comprises a plurality of levels each including one or more master keys, with the uppermost level of the master key hierarchy comprising a root master key that is stored in the protected storage 110 and at least one lower level of the master key hierarchy comprising a plurality of master keys that are stored in the general storage 112 under encryption by the root master key. Also, each of a plurality of master keys of a lowermost level of the master key hierarchy is associated with a different group of data items and is utilized to encrypt the data items of that group for storage in the general storage 112. However, other embodiments can utilize different types and configurations of master key hierarchies.

For example, as indicated above, in some embodiments a master key hierarchy may comprise multiple root master keys.

It is further assumed that at least a portion of the master keys of the master key hierarchy have been previously generated using the key generator 120 of the key manager 104. Moreover, it is assumed that particular ones of the master keys have been utilized by the encryption module 122 to encrypt other master keys for storage in portion 116 of the general storage 112 and to encrypt data items for storage in portion 118 of the general storage 112. The root master key 114 for the master key hierarchy is stored in protected storage 110.

In step 200, one or more data items from a given one of the groups are selected for deletion. Such selection may be responsive to a command received from a user device or other system entity that utilizes the storage array 102 for storage of data items. It should be noted in this regard that the term "deletion" is intended to be broadly construed, so as to encompass various arrangements for shredding the one or more data items or otherwise making the one or more data items effectively unreadable. Such deletion in some embodiments is illustratively assumed to be irrevocable. Also, the term "deletion" as broadly used herein is intended to encompass modification of an encrypted stored data item or other types of replacement of an encrypted stored data item.

In step 202, the master key corresponding to the given group is obtained by the decryption module 124 and used to decrypt the remaining data items of the given group using the corresponding master key. The "remaining data items" of the given group refers to those data items of the given group that have not been selected for deletion. The decryption module 124 in obtaining the master key corresponding to the given group will typically have to decrypt one or more intermediate master keys that are stored in encrypted form in the portion 116 of the general storage 112.

In step 204, the corresponding master key is deleted and a replacement master key for the corresponding master key is obtained. The replacement master key is illustratively obtained from the key generator 120 under the control of the master key hierarchy update controller 126.

In step 206, the remaining data items of the given group are re-encrypted by the encryption module 122 using the replacement master key. The re-encrypted remaining data items of the given group are then stored in portion 118 of the general storage 112. This step is part of what is illustratively referred to herein as "rolling over" the given data group.

In step 208, additional master keys of the master key hierarchy in a direct path from the replacement master key up to and including the root master key of the uppermost level of the master key hierarchy are replaced. Again, this may involve generating replacement master keys in the key generator 120 under the control of the master key hierarchy update controller 126. The stored master keys of each of the levels of the master key hierarchy are updated as necessary to account for the replacement. This step is part of what is illustratively referred to herein as "rolling over" the master keys.

As mentioned previously, illustrative embodiments such as that described above in conjunction with FIG. 2 permit deletion of one or more selected data items in a given one of the groups without requiring decryption and re-encryption of any data items in any other ones of the groups. Thus, for example, only the remaining data items of the given group and the master keys of the master key hierarchy that are utilized in encrypting the data items of the given group are subject to "rolling over." This provides considerable efficiencies in deletion of stored encrypted data items from the portion 118 of the general storage 112, thereby improving overall performance of the storage system 100.

Figure 2:
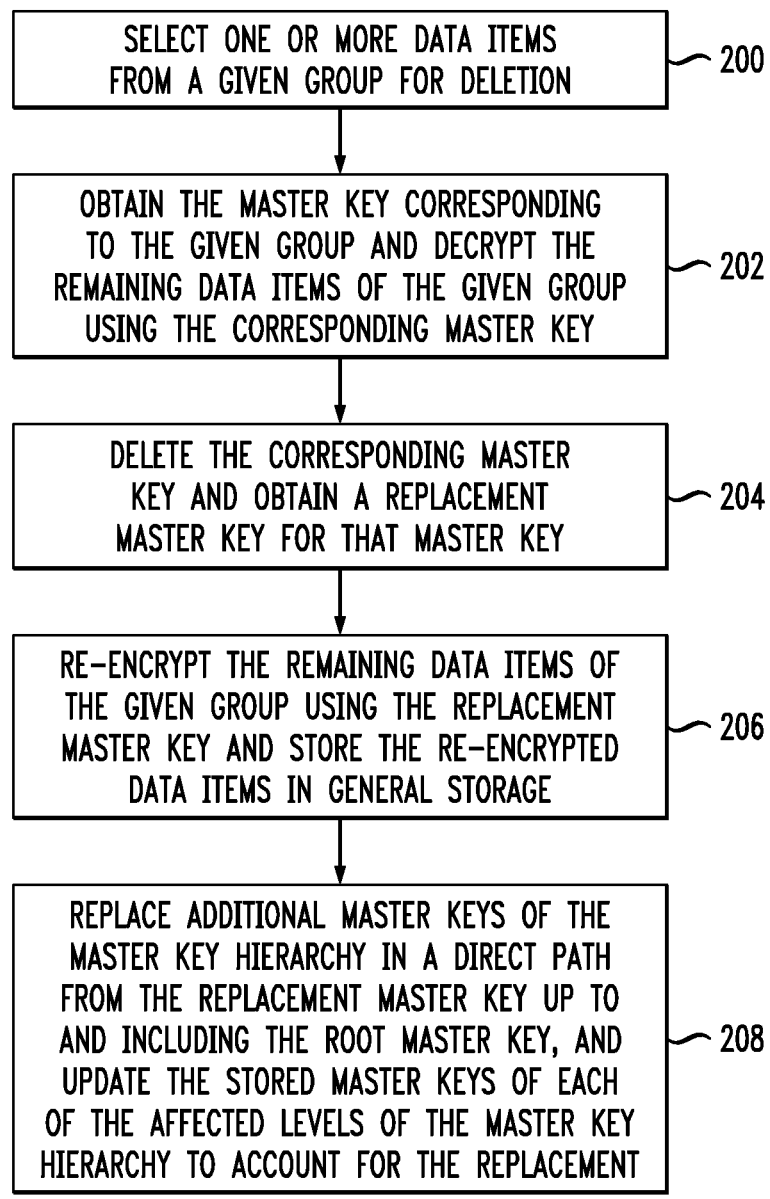
FIG. 2 is a flow diagram of an example process for deletion of one or more selected data items in a given group corresponding to a particular master key of a master key hierarchy in an illustrative embodiment.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a master key hierarchy. For example, the ordering of the process steps may be varied in other embodiments, or certain steps may be performed concurrently with one another rather than serially. As additional examples, one or more of the process steps may be repeated periodically for different processing instances, and multiple such processing instances can be performed in parallel with one another within a given storage system.

Also, functionality such as that described in conjunction with the flow diagram of FIG. 2 can be implemented at least in part in the form of one or more software programs stored in memory and executed by a processor of a processing device such as a computer or server. As mentioned previously, a storage device or other memory having executable program code of one or more software programs embodied therein is an example of what is more generally referred to herein as a "processor-readable storage medium."

Referring now more particularly to the example of FIG. 3, a master key hierarchy 300 comprises an uppermost level having a single root master key M, and a lowermost level that includes a master key Mka7 corresponding to a group of data items. That group of data items includes a particular selected data item 302 that is to be deleted, also referred to as a "secret" to be deleted.

The root master key M of the uppermost level of the master key hierarchy is used to encrypt master keys {M1, . . . Mn} of the immediately lower level of the hierarchy. Each of those master keys is itself used to encrypt another set of master keys in a next lower level of the hierarchy. For example, master key Mk is used to encrypt the set of child master keys {Mk1, Mk2, . . . Mkj}. Each of those master keys may in turn be used to encrypt its own set of child master keys. For example, master key Mka is used to encrypt a set of child master keys {Mka1, Mka2, . . . Mkab}. Those child master keys are assumed to be part of the lowermost level of the hierarchy in the present example, and accordingly each such master key is associated with and used to encrypt a corresponding group of stored data items. More particularly, master key Mka7 of the lowermost level of the hierarchy is used to encrypt a group of data items Gka7 that includes the selected data item 302 that is to be deleted from the general storage 112.

In this example, the selected data item 302 is deleted by retrieving the master key Mka7 corresponding to that group of data items. This involves retrieving root master key M from protected storage 110 and using it to decrypt master key Mk from general storage 112, which is then used to decrypt master key Mka from general storage 112, which is then used to decrypt master key Mka7 from general storage 112.

The decrypted master key Mka7 is used to decrypt any remaining items from the group containing data item 302 that are not being deleted. A replacement master key Mka7' is obtained, and the master key Mka7 is deleted. The remaining data items from the group are re-encrypted using the replacement master key Mka7' and stored in portion 118 of the general storage 112. This is the rolling over of the group of data items. Additional replacement master keys are obtained for Mka, Mk and M, and the corresponding sets of master keys are rolled over. Thus, all of the master keys that are in a direct path from replacement master key Mka7' up to and including the root master key M of the uppermost level of the master key hierarchy are replaced. This further involves rolling over the sets of master keys that include the replacement master keys and also replacing root master key M in protected storage 110.

Reference numeral 310 in the figure denotes the processing operations associated with rolling over the group of data items and the master keys. Again, the deletion of the selected data item 302 is achieved without requiring decryption and re-encryption of any of the data items from any of the other groups of data items encrypted by other master keys. The ordering of the operations can be varied in other embodiments, and certain of the listed operations can be performed at least in part in parallel with one another. Also, additional or alternative processing operations can be used in other embodiments.

The foregoing example is illustrative only, and should not be viewed as limiting the scope of any particular embodiment in any way. Those skilled in the art will appreciate that numerous alternative master key hierarchy configurations can be used in other embodiments. For example, a given master key hierarchy need not include the same number of elements in each of the lowermost and intermediate levels, and different levels of the hierarchy can each include master keys that are used to encrypt respective groups of data items.

More particularly, in the context of the FIG. 3 example, one or more of the n child master keys {M1, M2, . . . Mn} can be used to directly encrypt respective groups of data items. As a more particular example, M2 may directly encrypt a group of data items, while M3 may be the parent of c child master keys, and M4 may be the parent of d child master keys, where c≠d. Also, there could be multiple intermediate levels under M3 before reaching master keys used to encrypt respective groups of data items, and a different number of levels under M4 before reaching master keys used to encrypt respective groups of data items.

Illustrative embodiments provide a number of significant advantages relative to conventional arrangements. For example, one or more such embodiments can provide particularly efficient shredding of encrypted stored data items using a master key hierarchy in which certain master keys are utilized to encrypt respective partitioned groups of data items. This substantially reduces the number of stored encrypted data items that are "rolled over" in conjunction with deletion of selected data items. In addition, by storing most of the master key hierarchy in general storage and only the root master key in protected storage, the required size of the protected storage can be considerably reduced, leading to potential cost savings in a given storage system implementation.

As indicated previously, components of a storage system as disclosed herein can be implemented at least in part in the form of one or more software programs stored in memory and executed by a processor of a processing device. For example, at least portions of the key manager 104 and related functionality for generating and maintaining a master key hierarchy are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of storage systems and associated key managers. Also, the particular features of the illustrative embodiments of FIGS. 1-3 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a storage system comprising first storage of a first type and second storage of a second type with the first storage providing enhanced data protection relative to the second storage; and
   a key manager associated with the storage system and configured to maintain a master key hierarchy for the storage system;
   the master key hierarchy comprising a plurality of levels each including one or more master keys, with an uppermost level of the master key hierarchy comprising a root master key that is stored in the first storage and at least one lower level of the master key hierarchy comprising a plurality of master keys that are stored in the second storage under encryption by the root master key;
   wherein each of a plurality of master keys of a lowermost level of the master key hierarchy is associated with a different group of data items and is utilized to encrypt the data items of that group for storage in the second storage;
   wherein the key manager is configured to delete one or more selected data items of a given one of the groups by obtaining the corresponding master key of the master key hierarchy, decrypting the remaining data items of the given group using the corresponding master key, deleting the corresponding master key, obtaining a replacement master key for the corresponding master key, re-encrypting the remaining data items of the given group using the replacement master key, and storing the re-encrypted remaining data items of the given group in the second storage; and
   wherein the key manager is implemented utilizing at least one processing device comprising a processor coupled to a memory.

2. The apparatus of claim 1 wherein the key manager is at least partially incorporated within the storage system.

3. The apparatus of claim 1 wherein the storage system comprises at least one storage array.

4. The apparatus of claim 1 wherein the first storage comprises protected storage of the storage system and the second storage comprises general storage of the storage system.

5. The apparatus of claim 4 wherein at least a portion of the protected storage comprises a database of the key manager.

6. The apparatus of claim 1 wherein the key manager is further configured in conjunction with the deletion of the one or more selected data items of the given group to replace additional master keys of the master key hierarchy in a direct path from the replacement master key up to and including the root master key of the uppermost level of the master key hierarchy, and to update the stored master keys of each of the levels of the master key hierarchy to account for the replacement.

7. The apparatus of claim 1 wherein deletion of one or more selected data items in a given one of the groups is achieved without requiring decryption and re-encryption of any data items in any other ones of the groups.

8. The apparatus of claim 1 wherein at least one intermediate level of the master key hierarchy between the uppermost level and the lowermost level includes at least one master key that does not have any child master keys in an immediately lower level but is instead used to encrypt a corresponding group of data items for storage in the second storage.

9. The apparatus of claim 1 wherein two or more intermediate levels of the master key hierarchy comprise different numbers of master keys.

10. The apparatus of claim 1 wherein two or more intermediate levels of the master key hierarchy each include at least one master key that is used to encrypt a corresponding group of data items for storage in the second storage.

11. A method comprising:
    configuring a storage system to comprise first storage of a first type and second storage of a second type with the first storage providing enhanced data protection relative to the second storage; and
    maintaining a master key hierarchy for the storage system;
    the master key hierarchy comprising a plurality of levels each including one or more master keys, with an uppermost level of the master key hierarchy comprising a root master key that is stored in the first storage and at least one lower level of the master key hierarchy comprising a plurality of master keys that are stored in the second storage under encryption by the root master key;
    wherein each of a plurality of master keys of a lowermost level of the master key hierarchy is associated with a different group of data items and is utilized to encrypt the data items of that group for storage in the second storage;
    wherein maintaining a master key hierarchy for the storage system further comprises deleting one or more selected data items of a given one of the groups;
    wherein deleting one or more selected data items of the given one of the groups comprises:
    obtaining the corresponding master key of the master key hierarchy;
    decrypting the remaining data items of the given group using the corresponding master key;
    deleting the corresponding master key;
    obtaining a replacement master key for the corresponding master key;
    re-encrypting the remaining data items of the given group using the replacement master key; and
    storing the re-encrypted remaining data items of the given group in the second storage; and
    wherein the configuring and maintaining are implemented utilizing at least one processing device comprising a processor coupled to a memory.

12. The method of claim 11 wherein maintaining a master key hierarchy for the storage system further comprises:
    updating the master key hierarchy responsive to the deleting of the one or more selected data items.

13. The method of claim 12 wherein updating the master key hierarchy responsive to the deleting of the one or more selected data items comprises:
    replacing additional master keys of the master key hierarchy in a direct path from the replacement master key up to and including the root master key of the uppermost level of the master key hierarchy; and updating the stored master keys of each of the levels of the master key hierarchy to account for the replacement.

14. The method of claim 11 wherein deletion of one or more selected data items in a given one of the groups is achieved without requiring decryption and re-encryption of any data items in any other ones of the groups.

15. The method of claim 11 wherein at least one intermediate level of the master key hierarchy between the uppermost level and the lowermost level includes at least one master key that does not have any child master keys in an immediately lower level but is instead used to encrypt a corresponding group of data items for storage in the second storage.

16. The method of claim 11 wherein two or more intermediate levels of the master key hierarchy comprise different numbers of master keys.

17. The method of claim 11 wherein two or more intermediate levels of the master key hierarchy each include at least one master key that is used to encrypt a corresponding group of data items for storage in the second storage.

18. A non-transitory processor-readable storage medium having stored therein program code of one or more software programs, wherein the program code when executed by at least one processing device causes said processing device:

to configure a storage system to comprise first storage of a first type and second storage of a second type with the first storage providing enhanced data protection relative to the second storage; and to maintain a master key hierarchy for the storage system;

the master key hierarchy comprising a plurality of levels each including one or more master keys, with an uppermost level of the master key hierarchy comprising a root master key that is stored in the first storage and at least one lower level of the master key hierarchy comprising a plurality of master keys that are stored in the second storage under encryption by the root master key;

wherein each of a plurality of master keys of a lowermost level of the master key hierarchy is associated with a different group of data items and is utilized to encrypt the data items of that group for storage in the second storage;

wherein maintaining a master key hierarchy for the storage system further comprises deleting one or more selected data items of a given one of the groups;

wherein deleting one or more selected data items of the given one of the groups comprises:

obtaining the corresponding master key of the master key hierarchy;

decrypting the remaining data items of the given group using the corresponding master key;

deleting the corresponding master key;

obtaining a replacement master key for the corresponding master key;

re-encrypting the remaining data items of the given group using the replacement master key; and storing the re-encrypted remaining data items of the given group in the second storage.

19. The processor-readable storage medium of claim 18 wherein maintaining a master key hierarchy for the storage system further comprises:

updating the master key hierarchy responsive to the deleting of the one or more selected data items.

20. The processor-readable storage medium of claim 19 wherein updating the master key hierarchy responsive to the deleting of the one or more selected data items comprises:

replacing additional master keys of the master key hierarchy in a direct path from the replacement master key up to and including the root master key of the uppermost level of the master key hierarchy; and updating the stored master keys of each of the levels of the master key hierarchy to account for the replacement.

* * * * *